United States Patent
Malerevich et al.

(10) Patent No.: US 6,611,538 B1
(45) Date of Patent: Aug. 26, 2003

(54) DATA TRANSMISSION SYNCHRONIZATION SYSTEM

(75) Inventors: Oren Malerevich, Kiryat Ono (IL); Ilan Shimony, Haifa (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/321,469

(22) Filed: May 27, 1999

(51) Int. Cl.[7] .................................................. H04J 3/06
(52) U.S. Cl. ................... 370/503; 370/509; 370/395.51
(58) Field of Search ........................... 370/514, 395.52, 370/395.51, 395.62, 94.2, 352, 60.1, 102, 503, 509, 513; 714/758; 375/257, 364

(56) References Cited

U.S. PATENT DOCUMENTS

| | | | |
|---|---|---|---|
| 4,158,193 A | 6/1979 | D'Antonio | 340/146.1 |
| 4,608,703 A | 8/1986 | Kaga et al. | 375/114 |
| 4,807,259 A | 2/1989 | Yamanaka et al. | 375/109 |
| 4,984,251 A | 1/1991 | Perloff et al. | 375/38 |
| 5,163,071 A | 11/1992 | Gelin | 375/114 |
| 5,276,807 A | 1/1994 | Kodama et al. | 395/200 |
| 5,280,484 A * | 1/1994 | Weis | 370/102 |
| 5,367,543 A | 11/1994 | Uomoto | 375/116 |
| 5,568,486 A * | 10/1996 | Huscroft | 370/94.2 |
| 5,570,362 A * | 10/1996 | Nishimura | 370/60.1 |
| 5,610,951 A * | 3/1997 | Higginson | 375/364 |
| 5,872,811 A * | 2/1999 | Gusinov | 375/257 |
| 5,887,039 A | 3/1999 | Suemura et al. | 375/365 |
| 5,943,374 A | 8/1999 | Kokuryo et al. | 375/354 |
| 6,243,844 B1 * | 6/2001 | Tonks | 714/758 |
| 6,246,679 B1 * | 6/2001 | Yamamoto | 370/352 |
| 6,246,735 B1 | 6/2001 | Sano et al. | 375/364 |

OTHER PUBLICATIONS

Bernard Sklar, "Digital Communications Fundamentals and Applications" dated 1988 by PTR Prentice Hall pp. 460–464.*

* cited by examiner

*Primary Examiner*—Dang Ton
*Assistant Examiner*—Robert W. Wilson
(74) *Attorney, Agent, or Firm*—McDonnell Boehnen Hulbert & Berghoff; Howard Zaretsky

(57) ABSTRACT

An apparatus and method for providing synchronization in a data transmission system via the use of a short cyclic synchronization sequence inserted in the header of cells to be transmitted. A 2-bit sync sequence is inserted at the beginning of the header in each cell. At the receiving end, a pair of state machines search for and track the sync sequence. A feedback signal is generated that is used by the receiver to adjust its framing so as to align the received data with the boundaries of the cells. To aid in detecting the sync sequence, the two sync bits are rotated each cell cycle. To avoid confusion with data that mimics the sync sequence, the transmitter transmits idle cells containing all ones except for the 2-bit sync sequence field during the period that the receiver is attempting to sync up with the transmitter.

18 Claims, 9 Drawing Sheets

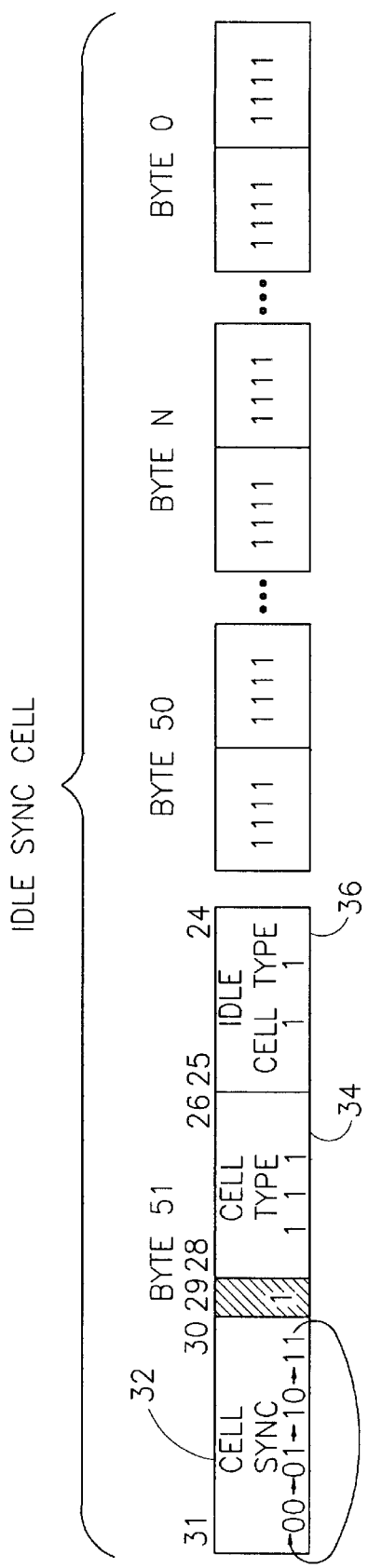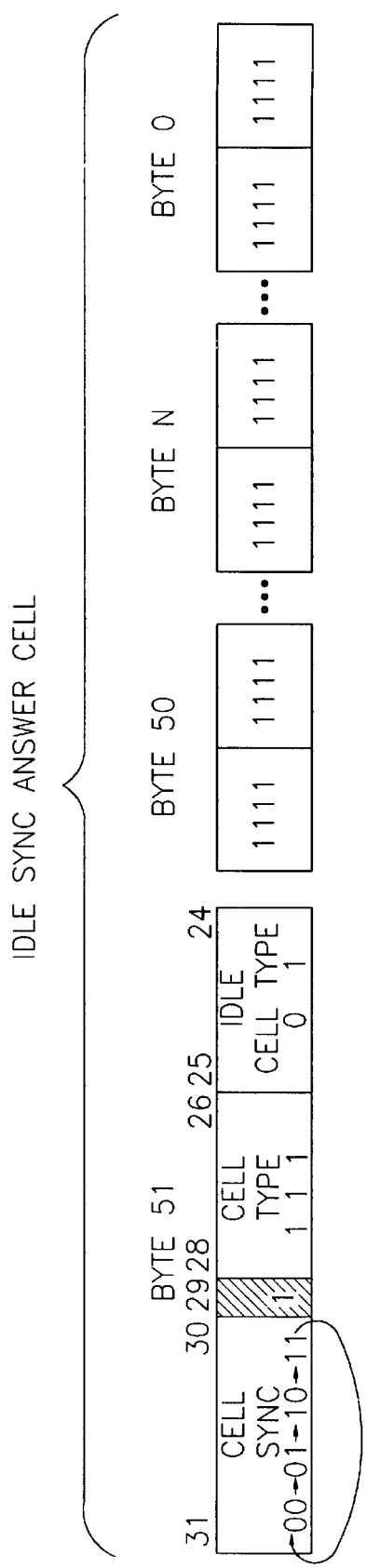
FIG.2
FIG.3

DATA TRANSMISSION SYNCHRONIZATION SYSTEM

FIELD OF THE INVENTION

The present invention relates generally to data transmission systems and more particularly relates to a system for synchronizing data transmission between two computers, ICs, interboard connections or between other types of data interfaces in a data transmission system.

BACKGROUND OF THE INVENTION

In numerous data links in which digital data is transmitted between ICs, printed circuit boards or computers, a specific synchronization pattern or sequence is added to the leading end or to both the leading and trailing ends of each block of data, e.g., cell, packet, frame, etc., in order to provide synchronization. Particularly, where the packets are variable in length, reliable detection of the delimiter is necessary for the recognition of the leading and trailing packet ends.

In parallel digital data transmission, the parallel data is often converted using time division multiplexing into a serial signal for transmission of the data on a reduced number of data lines. In such a data transmission system, the receiving side must achieve cell or frame synchronization for the serial-to-parallel conversion in order to ensure that the parallel data input on the transmitting side and the parallel data output on the receiving side are in sync with one another. To realize synchronization, a specific synchronization pattern is typically used which enables the receiving side to achieve synchronization.

In addition, there may be a problem where the same pattern as the synchronization sequence is present in the data and can be erroneously judged to be the synchronization pattern. A second problem that may arise in the data link is that of transmission time differences or skews from one cell or packet to the next. In the case of transmitting parallel data after the parallel-to-serial conversion, there is a requirement for synchronization on the receiving side. For the restoration to the original parallel data it is necessary to discriminate each cell or packet after the serial-to-parallel conversion. Some form of correction must be provided to align the data being received with a cell or packet boundary. This requires a certain period of time. It is desirable to make this time as small as possible since during this time, no data can be transmitted. A synchronization sequence can be used but this causes a reduction in the transmission bandwidth. Thus, it is desirable to have a synchronization sequence that causes a minimum reduction in transmission bandwidth in terms of the number of bits required but yet enables the receiver to properly sync up with the transmitter.

SUMMARY OF THE INVENTION

The present invention is an apparatus and method for providing synchronization in a data transmission system. The invention is applicable in numerous situations where data is transmitted from one point to another in blocks of data such as cells, packets, frames, etc. The invention is described in the context of circuitry suitable for use in transmitting ATM/Ethernet cells between modules on a PCB. The data is transmitted over one or more differential lines along with a clock signal. Note, however, that the invention is suitable in numerous other applications, as would be obvious to one skilled in the art.

The invention achieves synchronization via the use of a short synchronization sequence that is inserted in the header of the cell to be transmitted. The conventional 5 byte ATM header of the cell is stripped off and a 4-byte header is used in its place. A 2-bit sync sequence is inserted at the beginning of the header. At the receiving end, a pair of state machines search for and track the sync sequence. A feedback signal is generated that is used by the receiver to adjust its framing in order to align the received data with the boundaries of the cells.

To aid in detecting the sync sequence, the sync bits are rotated each cell cycle in the following cyclical fashion: 00, 01, 10, 11. The sync sequence is cycled and transmitted with each cell. To avoid confusion with data in the cell that mimics the sync sequence and to minimize the synchronization time, the remote transmitter transmits special idle cells that contain all ones except for the 2-bit sync sequence field during the period that the adjacent receiver is attempting to sync up with the remote transmitter.

Thus, if the receiver on side A is not synchronized, for example, it will make sure that the receiver on side B is synchronized by sending special sync cells. If the receiver on side B is already synchronized, the special sync cells cause the transmitter on side B to send a special cell that assists the receiver on side A to synchronize.

There is provided in accordance with the present invention, in a bidirectional data transmission system, including a first and second side, each side including a transmitter and a receiver, a method of synchronizing the transmission of blocks of data from transmitter to receiver in both directions, the method comprising the steps of inserting a synchronization field into a header preceding the block of data, cycling the value of the synchronization field wherein the synchronization field is cycled once for each block of data to be transmitted, transmitting idle sync cells during the time the receiver attempts to synchronize with the transmitter, transmitting, by a transmitter on the first side, idle sync answer cells in response to the receiver on the first side receiving idle sync cells from the transmitter on the second side, searching, on the receiver, for the cycle synchronization sequence and adjusting the framing of the data received by the receiver in the event the synchronization sequence is not found within a predetermined period of time.

The synchronization field comprises two bits and is cycled through the pattern: 00, 01, 10, 11 and the block of data comprises an Asynchronous Transfer Mode (ATM) 48 byte cell payload. The idle block comprises all one except for the synchronization field. The step of synchronizing comprises the step of providing a count state machine and a sync state machine to search for and track the cycling of the synchronization field sequence. The period of time comprises a multiple number of cell times wherein each cell comprises 48 bytes.

There is also provided in accordance with the present invention an apparatus for synchronizing the transmission of blocks of data comprising a transmitter comprising means for generating a synchronization field to be inserted into a header that is transmitted preceding the block of data, the synchronization field cycled once for each block of data transmitted, means for transmitting an idle block of data during attempts to synchronize the transmission of the blocks of data, a receiver comprising means for searching a received data stream for the cyclic synchronization sequence and means for adjusting the framing of data received by the receiver in the event the synchronization sequence is not found within a predetermined period of time.

BRIEF DESCRIPTION OF THE DRAWINGS

The invention is herein described, by way of example only, with reference to the accompanying drawings, wherein:

FIG. 2 is a diagram illustrating the structure of an idle sync cell of the data link of the present invention;

FIG. 3 is a diagram illustrating the structure of an idle sync answer cell of the data link of the present invention;

DETAILED DESCRIPTION OF THE INVENTION

Notation Used Throughout

Figure 1:
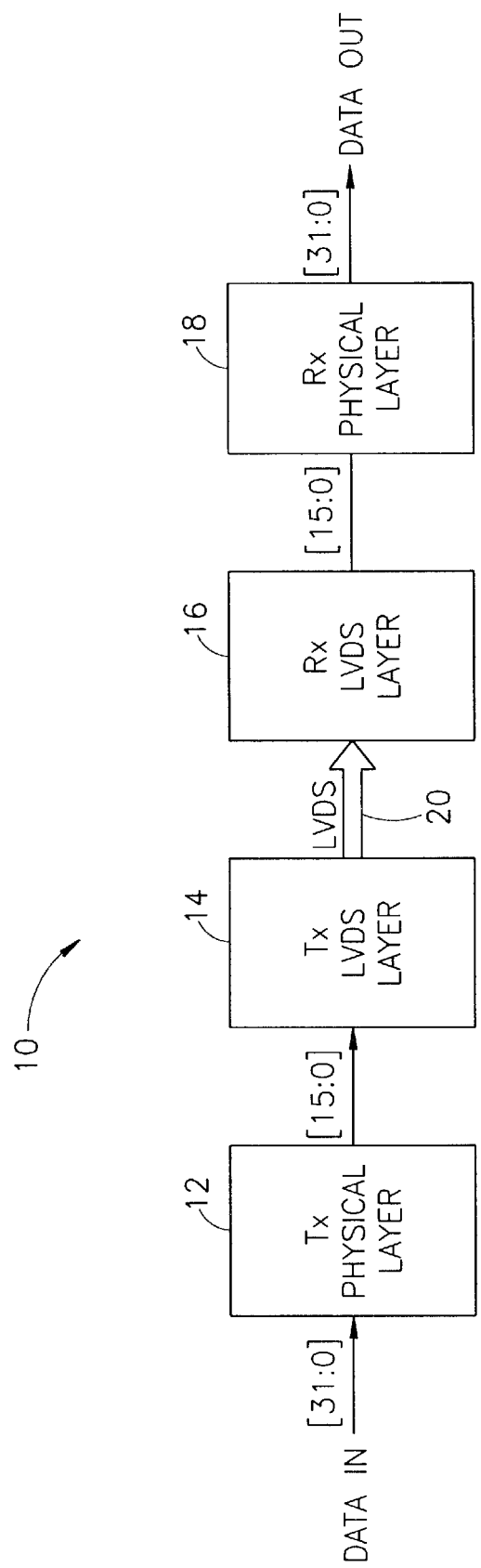
FIG. 1 is a block diagram illustrating a data communications system embodying the synchronization method of the present invention.

The following notation is used throughout this document.

| Term | Definition |
| --- | --- |
| ATM | Asynchronous Transfer Mode |
| FIFO | First In First Out |
| IC | Integrated Circuit |
| LVDS | Low Voltage Differential Signal |
| PCB | Printed Circuit Board |
| SL | Serial Link |

The present invention is an apparatus for and a method of synchronizing a data transmission link. The invention has application to any type of data transmission system where it is desired to synchronize the sending and receiving of data from one point to another. The invention is described within the context of a communication link tailored to transport ATM cells. The standard 5 byte ATM header is stripped off and replaced with a 4 byte serial link (SL) header. It is important to note that although the invention is described in the context of a link for transferring ATM cells, one skilled in the art can apply the principles of the present invention to numerous other types of data transmission systems.

The serial link described herein provides a full duplex point to point high data rate (1.6 Gbps in each direction) interconnection. The link is divided into layers, with the physical layer providing the interface between a data source and the lower level Low Voltage Differential Signal (LVDS) layer. The LVDS layer provides digital to analog to serial conversion and serial to analog to digital conversion. In accordance with the example provided herein, the serial link is used to transfer 52-byte of data from one point to another. The packets are organized as a 4-byte header and 48-byte cell. Each direction of the full duplex serial link is implemented using 4 four differential data signals and one differential clock signal. Note that the serial link is always active, meaning cells are always being transmitted over the link. If there is no data to send, a special idle cell is generated to maintain the cell frame logic circuitry in synchronization.

The serial link described herein provides a full duplex point to point high data rate (1.6 Gbps in each direction) interconnection. The link is divided into layers, with the physical layer providing the interface between a data source and the lower level LVDS layer. The LVDS layer provides digital to analog to serial conversion and serial to analog to digital conversion. In accordance with the example provided herein, the serial link is used to transfer 52 byte of data from one point to another. The packets are organized as a 4 byte header and 48 byte cell. Each direction of the full duplex serial link is implemented using 4 differential data signals and one differential clock signal. Note that the serial link is always active, meaning cells are always being transmitted over the link. If there is no data to send, a special idle cell is generated to maintain the cell frame logic circuitry in synchronization.

The system 10 comprises a transmit portion consisting of Tx physical layer 12 and Tx low voltage differential signal (LVDS) layer 14. The receive portion of comprises Rx a LVDS layer 16 and Rx physical layer 18. The Tx LVDS layer 14 communicates with the Rx LVDS layer 16 via a plurality of LVDS signals 20. In this example, the link comprises four differential serial data signals and one differential clock signal. The input to the system 10 is a 32 bit data input word and the output of the system is a 32 bit data output word.

Depending on the configuration, components used, desired communication speed and application of the invention, the LVDS signals may comprise traces on the PCB or wires in a cable. In the example provided herein, the 32 bit input data is clocked in at a rate of 50 MHz. The data is transmitted over the LVDS link at a an aggregate rate of 1.6 Gbps or at a rate of 400 Mbps on each of the four differential serial data signals. The clock signal runs at 200 MHz with both edges of the clock being used.

A 4-byte header is appended prepended to the 48-byte payload of an ATM cell and input to the Tx physical layer 12 for transmission over the link 20. The invention provides synchronization between the Tx physical layer 12 and the Rx physical layer 18. Synchronization is achieved very quickly utilizing only two bits per cell. State machines located in the Rx physical layer implement the synchronization method of the present invention. The value of the two synchronization bits is changed on a cyclical basis for every cell. The two synchronization bits cycle through the values 00, 01, 10, 11 cycling from one value to the next every cell. To avoid synchronizing on the data contained in a data cell and to achieve fast synchronization, the transmitter transmits special idle cells, wherein most of the bits are set to 1 (except for the two synchronization bits), while the receiver is not in sync. Data cells are transmitted after synchronization is achieved. The two synchronization bits are also transmitted in the data cells.

Two diagrams illustrating the cell structure is as used throughout the synchronization process are shown in FIGS. 2 and 3. The header attached to the 48 byte ATM payload comprises 4 four bytes having a number of fields. Only a few fields are used for synchronization purposes, while the remaining fields are implementation and application specific and not related to the invention. The synchronization related fields comprise a two bit cell sync field 32 located at the beginning of the header in bit locations 31 and 30, a three bit cell type field 34 and a two bit idle cell type field 36. The cell type is '111' for an idle cell that is transmitted when the receiver is out of sync with the transmitter. There are two types of idle cells: an idle-sync cell represented by an idle cell type of '11' and an idle sync answer cell represented by an idle cell type of '01'.

The format of the idle sync cell is illustrated in FIG. 2 while the format of the idle sync answer cell is illustrated in FIG. 3. Note that in both types of idle cells, the cell sync field rotates through 00, 01, 10 and 11 in accordance with the synchronization system of the present invention.

The data is transmitted in cells with cell types that are different than '111'. If no data is transmitted and both receivers are in the sync state, then idle no data cells are transmitted. Idle no data cells have a cell type of '111' and an idle cell type of '00'. The bits in the remaining bytes, i.e., bytes 50 to 0, however, are not necessarily all ones.

Figure 4A:
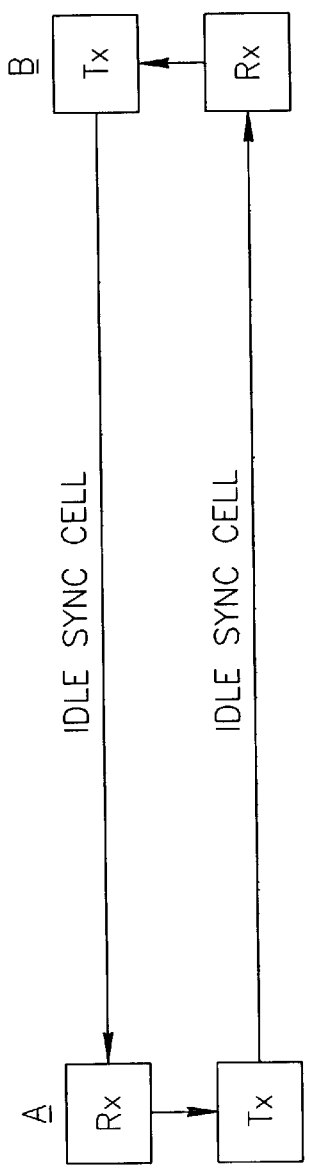
FIGS. 4A, 4B and 4C are diagrams illustrating the various different system states within which cells are transmitted on each side of the link.
Figure 4B:
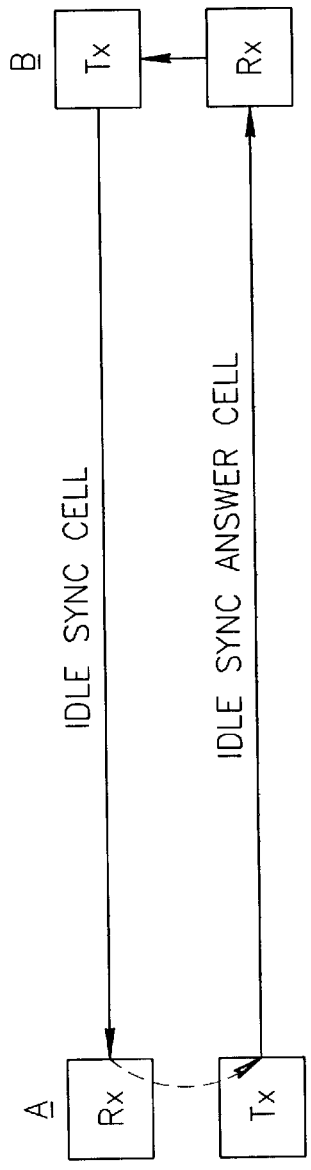
Figure 4C:
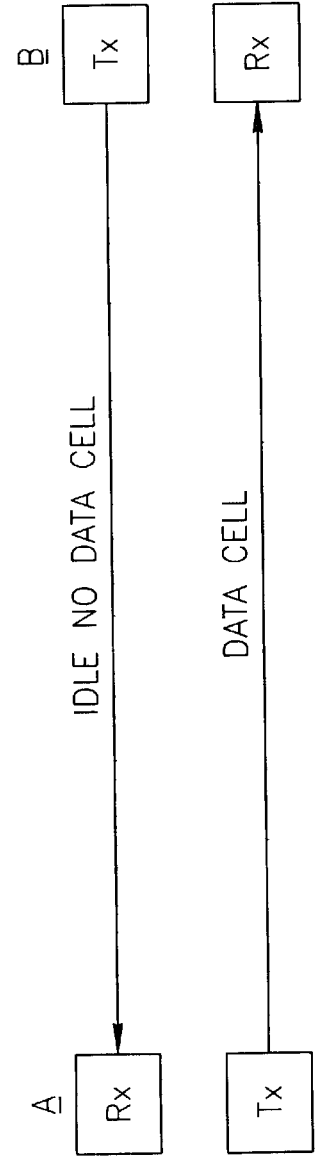

A diagram illustrating the various different system states within which cells are transmitted on each side of the link is shown in FIGS. 4A, 4B and 4C. FIG. 4A illustrates the case when the receiver state machines on both sides A and B are trying to synchronize. The receivers on both sides cause their associated transmitters to send idle sync cells to the other side. Side B is not synchronized so the receiver on side B requests the transmitter on side B to transmit an idle sync cell that will assist side A to synchronize.

FIG. 4B illustrates the case when the receiver on side A is synchronized but the receiver on side B is not. In this case, A is already synchronized so the idle sync cell is transmitted from side B forces side A to transmit an idle sync answer cell toward side B which will assist side B to synchronize.

FIG. 4C illustrates the case when both sides A and B are synchronized and data cells or idle no data cells flow between the sides.

Figure 5:
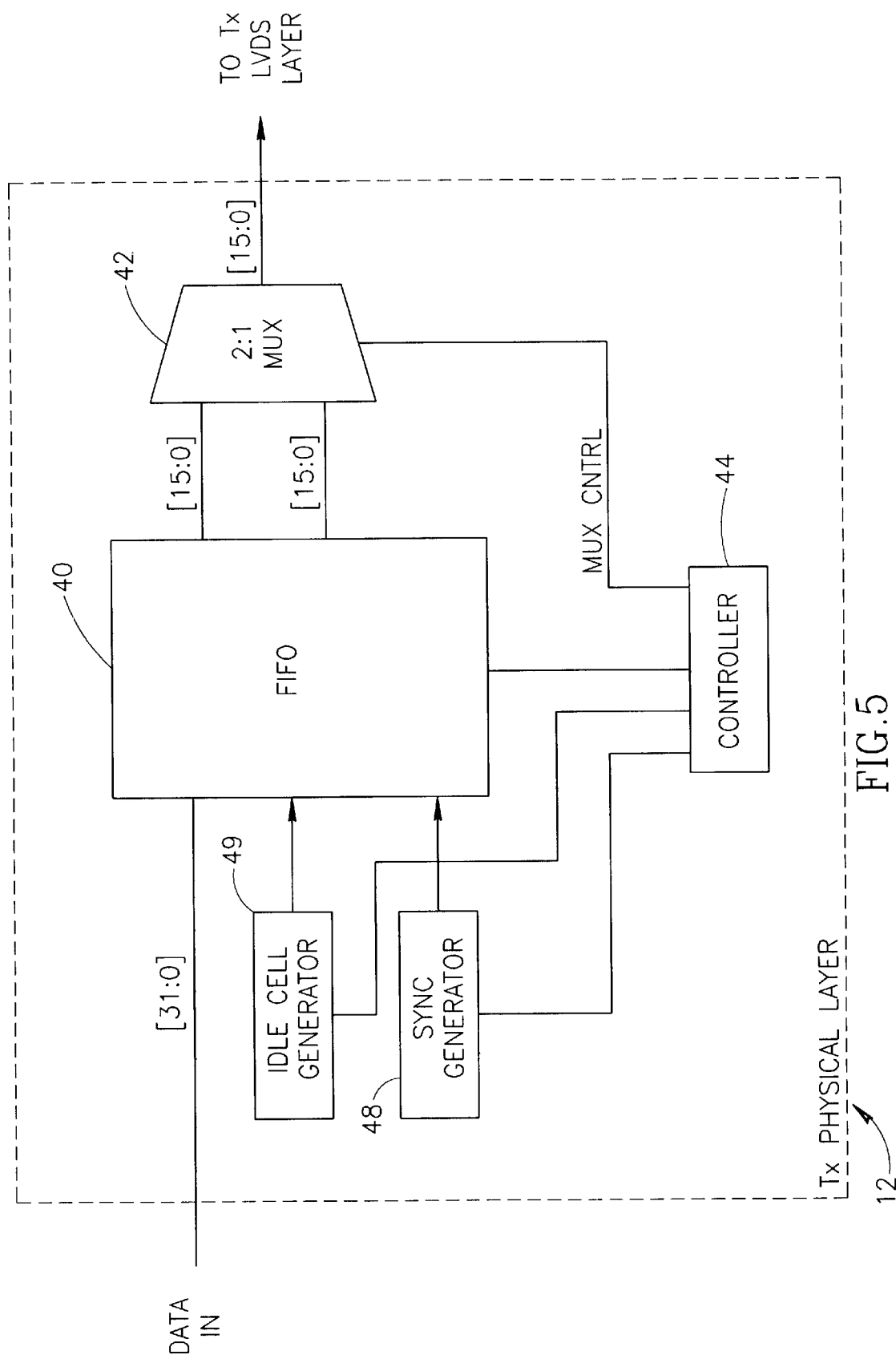
FIG. 5 is a block diagram illustrating the Tx physical layer of the data communication system of the present invention in more detail.

The Tx physical layer will now be described in more detail. A block diagram illustrating the Tx physical layer of the data communication system of the present invention in more detail is shown in FIG. 5. The Tx physical layer 12 comprises a cell FIFO 40, 2-to-1 multiplexor (mux) 42, a sync generator 48, an idle cell generator 49 and a controller 44. The Tx physical layer functions to provide the interface to the data source and place the incoming cells in the FIFO. The sync generation circuitry functions to generate the sync pattern 00, 01, 10, 11 and insert it into the header of every cell. In addition, the controller causes idle cells to be generated and inserted via the idle cell generator 49 when there is no data to transmit and during the synchronization process.

The Tx physical layer is operative to always generate cells, no matter what type of cells they are, i.e. either data or idle cells, The 32-bit data output of the FIFO is split into two 16 bit data words that are input to the 2 to 1 mux 42. The mux 42 is controlled via a mux control signal generated by the controller 44. The 16 bit output of the mux 42 is input to the Tx LVDS layer 14.

Figure 6:
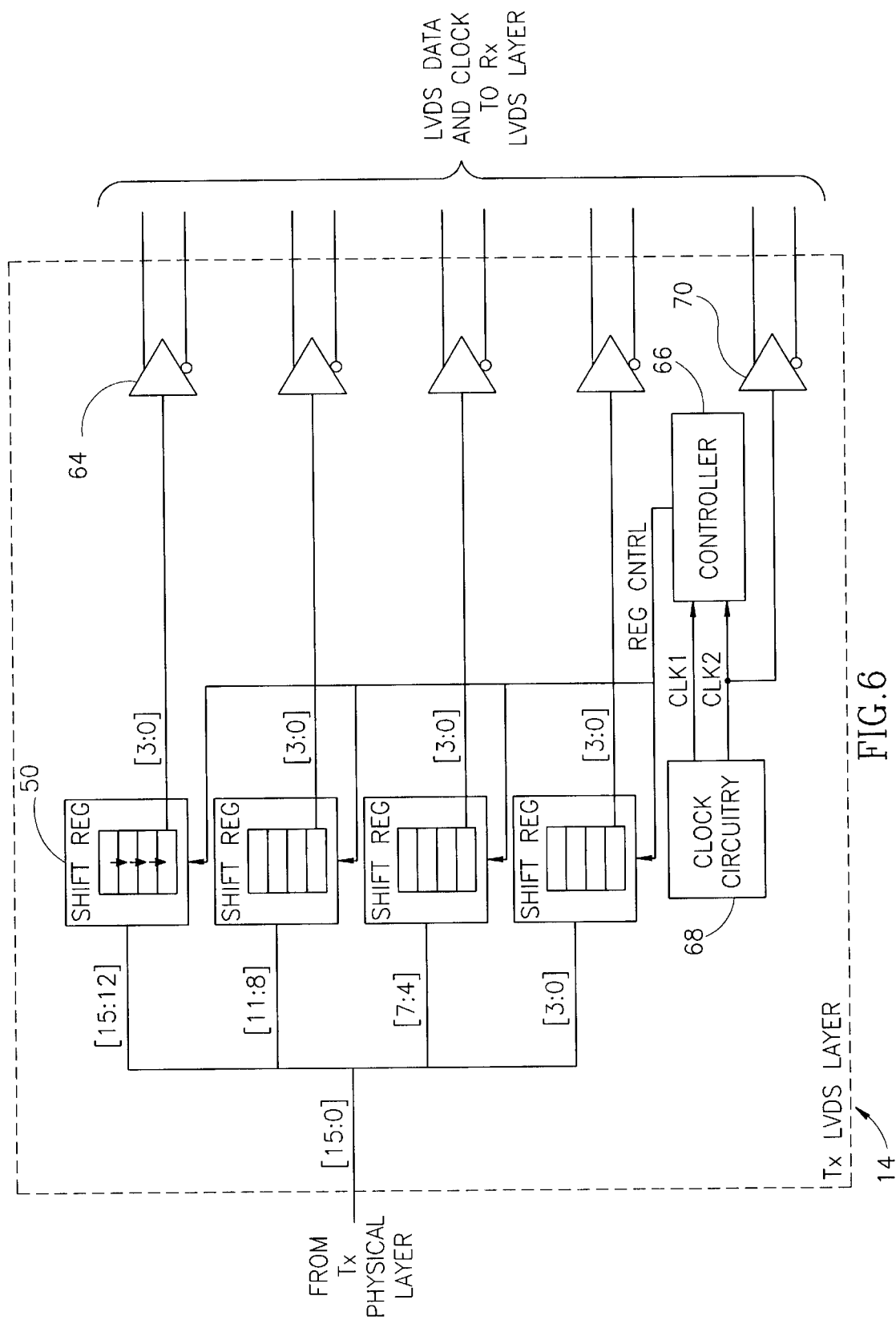
FIG. 6 is a block diagram illustrating the Tx LVDS layer of the data communication system of the present invention in more detail.

The Tx LVDS layer will now be described in more detail. A block diagram illustrating the Tx LVDS layer of the data communication system of the present invention in more detail is shown in FIG. 6. The function of the Tx LVDS layer 14 is to generate a multiple serial bit stream from the 16 bit input from the Tx physical layer 12. The LVDS layer 14 comprises a plurality of four bit shift registers 50 and a plurality of differential line drivers 64. The LVDS layer 14 also comprises clock circuitry 68 for generating at least two clocks: CLK1 and CLK2, a controller 66 and a differential line driver 70.

The 16 bit input data is sampled every CLK1 cycle. The 16-bit input data is clocked into the plurality of shift registers 50, 4 adapted to hold four bits each. Data is clocked into the shift register in parallel and shifted out serially to the line drivers 64 that also perform an implicit A/D function. The shift registers are controlled such that each of the four registers is clocked during each cycle of CLK1. The output of the four differential line drivers 64 form the serial 4 four bits output of the Tx LVDS layer every CLK1 cycle.

The clock circuitry 68 functions to generate the CLK1 and CLK2 signals. The CLK2 signal is twice the frequency of CLK1. In the example presented herein, the CLK1 frequency is 100 MHz and the CLK2 frequency is 200 MHz. The CLK2 signal is input to a differential line driver 70 and transmitted parallel with the 4 four serial bits over the LVDS link.

The clocking of the shift registers 50 is controlled by the controller 66 via signal lines REG_CNTRL. The REG_CNTRL is the same for all the registers 50.

Depending on the implementation, CLK1 and CLK2 are utilized by the controller 66 to generate the control signals for the registers 50. Both rising and falling edges of CLK2 can be used to generate the mux control signal. Note that the 16 bit input data is clocked at 100 MHz and four serial bits are transmitted over the LVDS link at a clock rate of 400 MHz, i.e., every, 2.5 ns.

Figure 7:
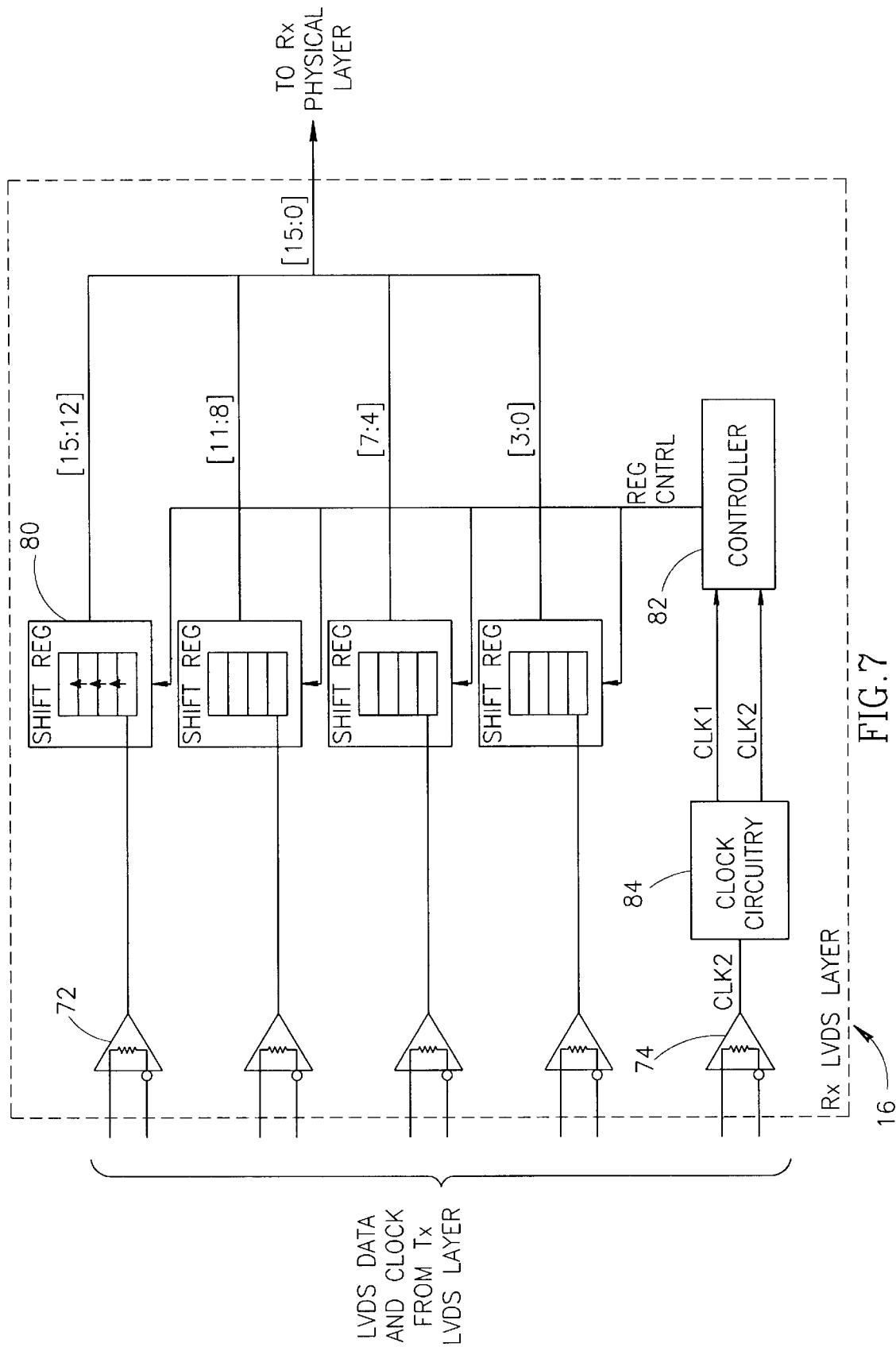
FIG. 7 is a block diagram illustrating the Rx LVDS layer of the data communication system of the present invention in more detail.

The Rx LVDS layer will now be described in more detail. A block diagram illustrating the Rx LVDS layer of the data communication system of the present invention is shown in FIG. 7. The function of the Rx LVDS layer 16 is to convert the multiple serial bit stream into a 16-bit data words and to provide clock synchronization.

The differential serial data transmitted by the Tx LVDS layer is received over a plurality of differential signal line by the Rx LVDS layer 16. The input differential signals are input to a plurality of differential line receivers 72, which function to convert the differential input signal to a single ended signal. The output of the differential line receivers is a digital signal that is input to a plurality of shift registers 80.

The shift registers 80 are clocked at a rate of 400 MHz so as to clock in all four bits that were transmitted over each individual differential line. The combined output of the plurality of shift registers 80 forms the 16-bit data output that is clocked out at 100 MHz.

The clocking of the shift registers 80 is controlled by the controller 82 via the REG_CNTRL signal. The clock for the shift registers 80 are clocked at a rate of 400 MHz using a clock signal derived from the CLK2 signal transmitted from the Tx LVDS layer and received by the differential line receiver 74 and subsequently input to clock circuitry 84. Both CLK1 and CLK2 signals are input to the controller 82.

The Rx physical layer will now be described in more detail. A block diagram illustrating the Rx physical layer of the data communication system of the present invention in more detail is shown in 8B FIG. 8. The function of the Rx physical layer 18 is to synchronize the input data stream on a cell boundary and to drop idle cells. The Rx physical layer 18 comprises a plurality of registers 90, and 92, a plurality of 4-bit wide 4-to-1 multiplexers 94, sync FIFO 98, 16-bit wide 1 to 2 demux 100 and a 32-bit wide FIFO 102. The physical layer 18 also comprises a count state machine 104, sync state machine 106 and a controller 108.

The data that is received from the Rx LVDS layer is clocked into a two stage register comprising a first bank of 4-bit registers 90 and second bank of 4-bit registers 92. The output of both register stages is input to 4-bit wide 4-to-1 multiplexers 94. Each mux is adapted to select one of four inputs to its output wherein each input and the output is 4-bits wide. Each of the four inputs to the mux is shown as four data signals indicated within the square brackets. Only seven of the eight bits of the two banks of registers is input to the 4-to-1 mux. The seven bits are indicated by the letters 'a' through 'g'. The four inputs to the mux comprise: (1) data signals 'a' through 'd', (2) data signals 'b' through 'e', (3) data signals 'c' through 'f', and (4) data signals 'd' through 'g'. These are the four possible sequences for the synchronization bits and represent the four possible framing scenarios. The first framing scenario, i.e., signals a through d, is correct, with the other three framing scenarios being incorrect and which require alignment to correct. The inputs to the other three muxes are fashioned in the same way for the remaining 12 bits of the input.

When the receiver is searching for sequences of synchronization bits, the controller 108 changes the mux selection control signal to select different framing positions. The count state machine and sync state machine are operative to generate a CHANGE_MUX_STATE signal that is input to the controller 108 and used to generate the MUX_CNTRL signal. The controller selects different inputs in the multiplexers until synchronization is achieved. In one implementation of the invention, the sync state machine causes the mux select control to be changed every 4 four cell times, while the receiver is not in sync. Thus, with four possible mux states, the start of the sync sequence must be found after a maximum of 16 cells. This is assuming there are no synchronization sequence bits in the payload of the cells. To avoid confusion, special idle cells, i.e., idle sync cells, idle sync answer cells, are used which contain almost all ones except for the cyclic 2-bit sync sequence.

The four bit outputs of each of the muxes 94 are input to a 16-bit wide sync FIFO 98. The output is input the 16-bit wide 1-to-2 demux 100. The demux 100 is controlled by the controller 108 via the DEMUX_CNTRL signal. The most significant four bits also comprise the input to the count state machine 104. The two 16 bit outputs of the demux 100 is input to a 32-bit wide FIFO 102 whose output forms the output of the Rx physical layer.

The plurality of registers 90, 92, muxes 94, sync FIFO and demux 100 are clocked at a rate of 100 MHz. The FIFO 102 can be clocked at 50 MHz to sustain the required data rate.

Figure 9:
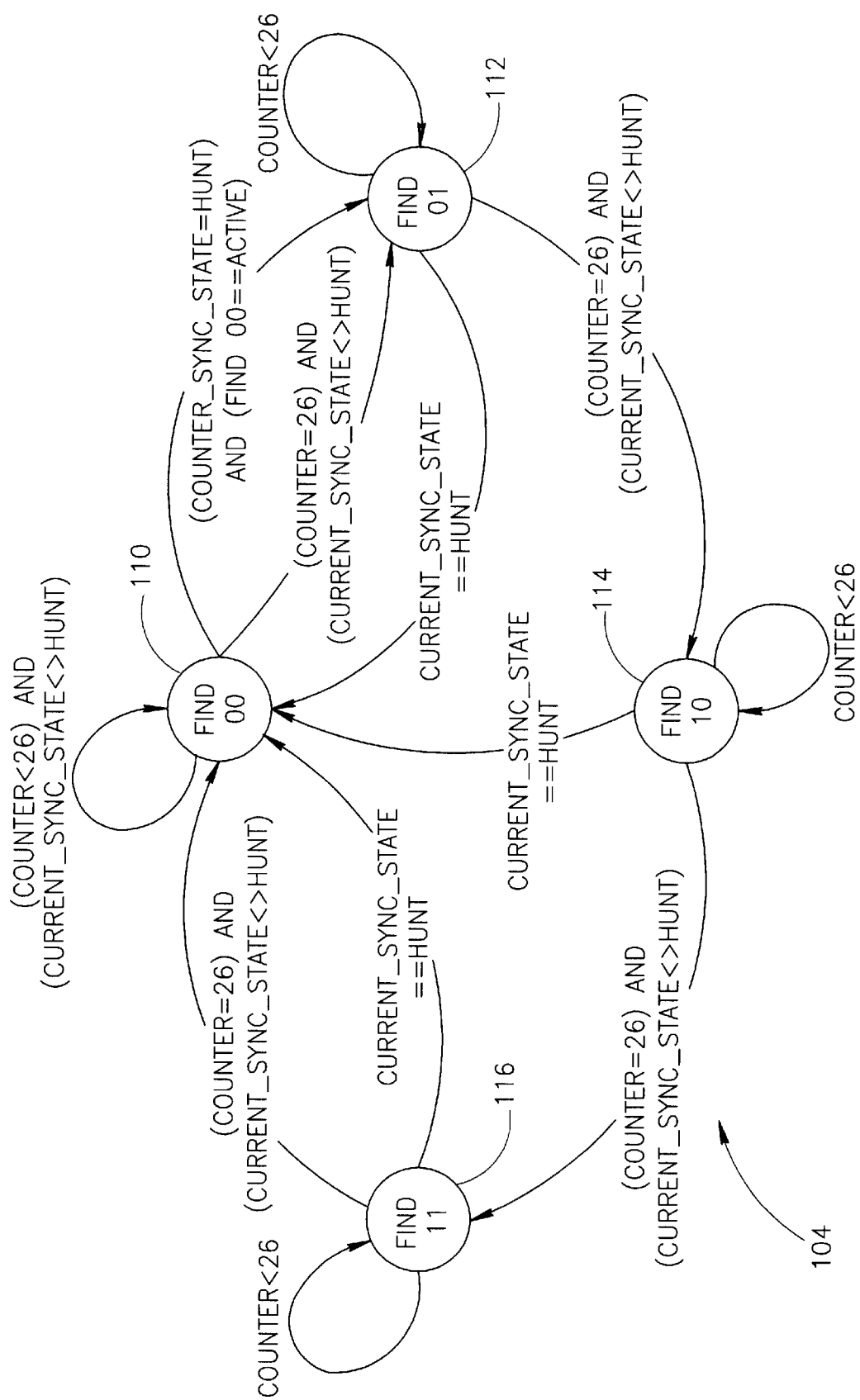
FIG. 9 is a diagram illustrating the count state machine of the data communication system of the present invention.
Figure 10:
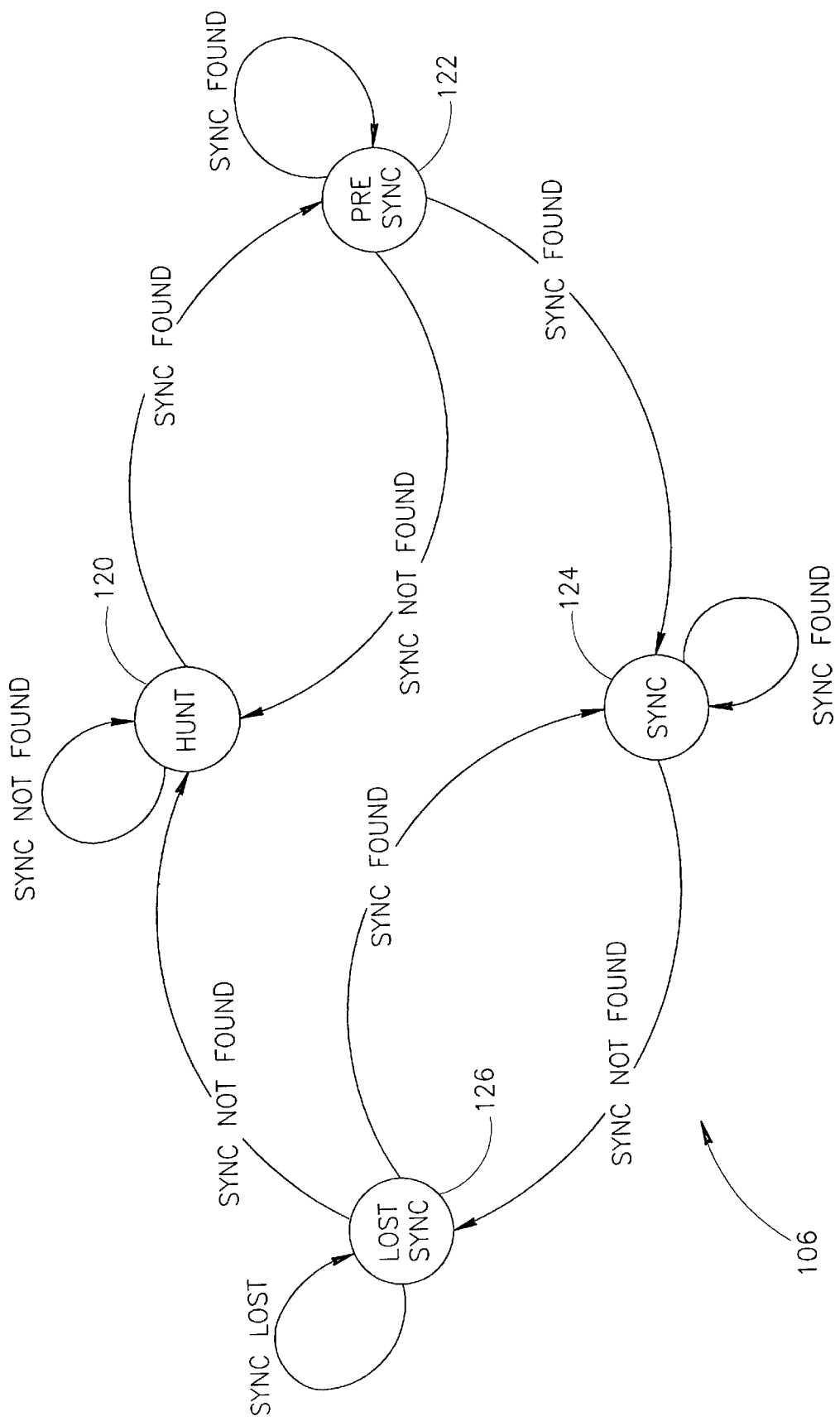
FIG. 10 is a diagram illustrating the sync state machine of the data communication system of the present invention.

The count state machine 104 and sync state machine 106 will now be described in more detail. A diagram illustrating the count state machine of the data communication system of the present invention is shown in FIG. 9 and a diagram illustrating the sync state machine is shown in FIG. 10.

The count state machine functions to search the most significant two bits of data output of the mux 94 (FIG. 8) for the sync sequence of 00, 01, 10, 11. The count state machine communicates with the sync state machine via a signal that indicates whether sync was found or not. Once the count state machine finds the start of the sync sequence, the search for the next sync sequence is performed after 26 CLK1 cycles, i.e., a cell time or 26×16=416 bits. In the event sync is lost after finding a sync sequence, searching begins again immediately after the previous sync sequence found.

The machine starts up in the Find 00 state 110 wherein the sync sequence 00 is searched for. The machine remains in this state while the counter is less then 26, i.e., less than a cell time, and if the current state of the sync state machine is other than Hunt (state 120 FIG. 10). If the counter reaches 26 and the sync state machine is not in the Hunt state, then if 00 was found, the SYNC_FOUND signal is asserted, otherwise the SYNC_NOT_FOUND signal is asserted. In both cases, the machine moves to the Find 01 state 112. If the sync state machine is in the Hunt state and the sequence 00 is found, then SYNC_FOUND is asserted and the machine moves to the Find 01 state.

The machine remains in the Find 01 state while the counter is less then 26. After 26 clocks, if the sync state machine is in the Hunt state, the machine moves to the Find 00 state. If the sync state machine is not in the Hunt state and the sequence 01 was found, SYNC_FOUND is asserted, otherwise, if 01 was not found, SYNC_NOT_FOUND is asserted. In either case, the machine moves to the Find 10 state 114.

The machine remains in the Find 10 state while the counter is less then 26. After 26 clocks, if the sync state machine is in the Hunt state, the machine moves to the Find 00 state. If the sync state machine is not in the Hunt state and the sequence 10 was found, SYNC_FOUND is asserted, otherwise, if 10 was not found, SYNC_NOT_FOUND is asserted. In either case, the machine moves to the Find 11 state 116.

The machine remains in the Find 11 state while the counter is less then 26. After 26 clocks, if the sync state machine is in the Hunt state, the machine moves to the Find 00 state. If the sync state machine is not in the Hunt state and the sequence 11 was found, SYNC_FOUND is asserted, otherwise, if 11 was not found, SYNC_NOT_FOUND is asserted. In either case, the machine moves to the Find 00 state 110.

Figure 8:
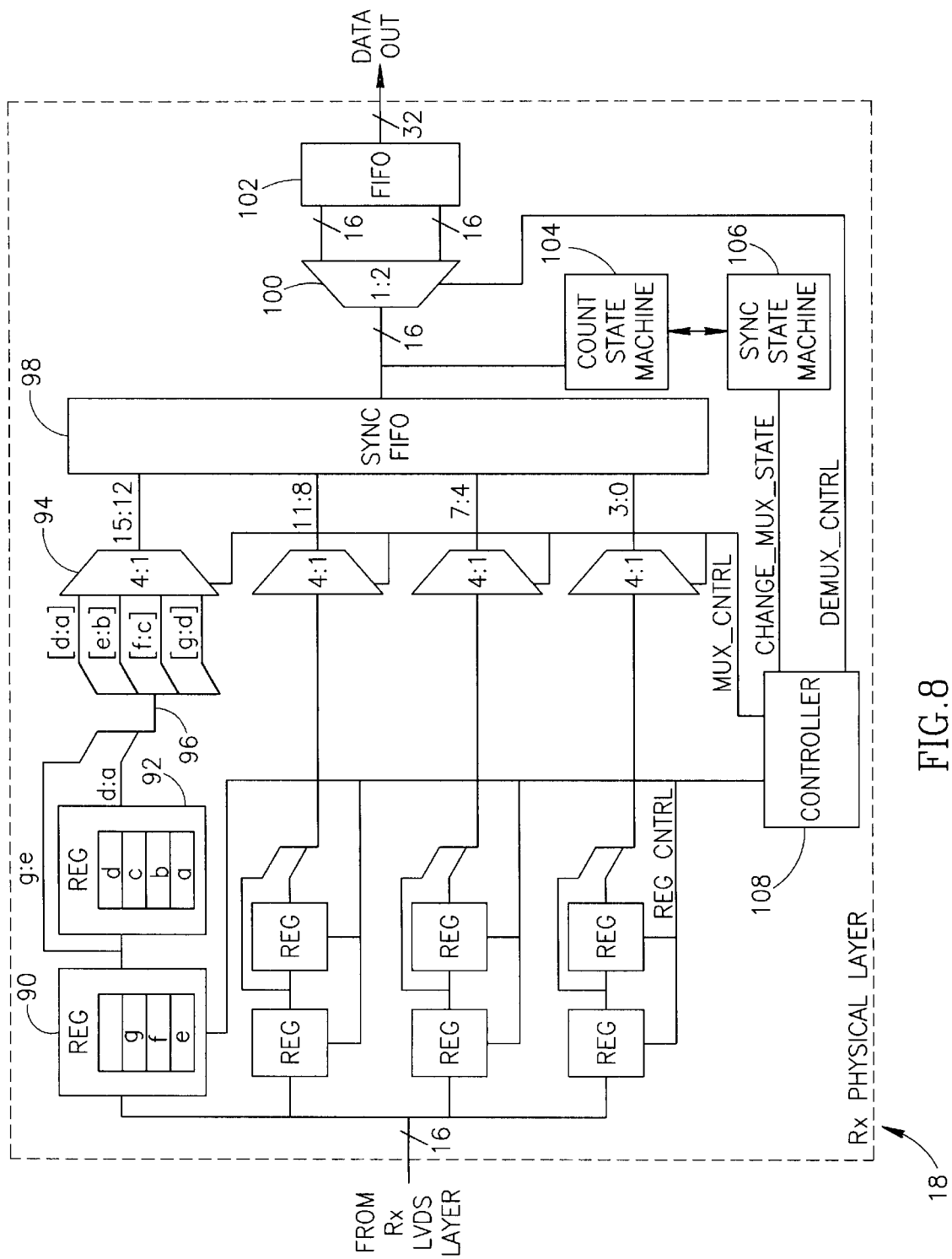
FIG. 8 is a block diagram illustrating the Rx physical layer of the data communication system of the present invention in more detail.

The sync state machine 106 comprises four states Hunt 120, Pre Sync 122, Sync 124 and Lost Sync 126. The movement from one state to another is driven by the SYNC_FOUND and SYNC_NOT_FOUND signals generated by the count state machine. The sync state machine functions to control the mux selection input. In addition, while the machine is in the Sync state 124 or Lost Sync state 126, data is clocked into the sync FIFO 98 (FIG. 8). While the machine is in the Hunt state 120 or the Pre Sync state 122, the sync state machine is operative to signal the adjacent Tx physical layer to transmit idle sync cells which comprise all ones except for the sync sequence bits. This causes the remote Rx physical layer to synchronize and the remote Tx physical layer to also send idle sync answer cells. Note that the maximum sync time for either side is 16 cell times (4 mux states×4 cells). Since the link is bidirectional, the lost of sync in one direction effectively brings the link down and causes resynchronization to occur in both directions.

The machine begins in the Hunt state and remains in this state while sync is not found. If sync is not found after 4 cell times, the state of the mux is changed. The sync state machine asserts the CHANGE_MUX_STATE signal input to the controller 108 (FIG. 8). As a result, the controller generates the MUX_CNTRL signal to the mux select inputs of the multiplexers 94.

Once sync is found, the Pre Sync state is entered and remains there for a predetermined number of cycles while SYNC_FOUND is asserted. SYNC_NOT_FOUND causes the machine to move back to the Hunt state. If sync is found for the predetermined amount of time, the machine moves to the Sync state. The machine remains in the Sync state while SYNC_FOUND continues to be asserted.

If sync is lost, the Lost Sync state is entered. Once sync is recovered, the Sync state is entered again. The machine remains in the Lost Sync state while SYNC_NOT_FOUND is asserted. After a predetermined amount of time in the Lost Sync state, the machine moves to the Hunt state if sync still is not found.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

what is claimed is:

1. A method of synchronizing the transmission of blocks of data from a transmitter to a receiver, said method comprising the steps of:
    generating and inserting a 2-bit cyclical sequential synchronization sequence into a header preceding each block of data;
    continuously cycling the value of said synchronization sequence wherein said synchronization sequence is incremented or decremented once for each block of data to be transmitted, the sequence being reset when a maximum or minimum value is reached;
    transmitting idle sync cells during the time said receiver attempts to synchronize with said transmitter;
    transmitting said blocks of data over a plurality of serial transmission links to a receiver;
    at said receiver, receiving data over said plurality of serial transmission links;
    multiplexing different groups of received data bits, each group representing a different framing position, wherein one of said framing positions is selected in accordance with a selection signal;
    searching data output of a current framing position for said 2-bit synchronization sequence; and
    if synchronization is not found, repeatedly selecting a different framing position via said selection signal and searching said received data for said 2-bit synchronization sequence.

2. The method according to claim 1, transmitting idle sync answer cells in response to reception of idle sync cells.

3. The method according to claim 1, wherein said block of data comprises an Asynchronous Transfer Mode (ATM) 48 byte cell payload.

4. The method according to claim 1, wherein said idle block comprises all ones except for said synchronization sequence.

5. The method according to claim 1, wherein said step of searching comprises the step of providing a count state machine and a sync state machine to search for and track the cycling of said synchronization sequence.

6. The method according to claim 1, wherein said period of time comprises a multiple number of cell times wherein each cell comprises 48 bytes.

7. An apparatus for synchronizing the transmission of blocks of data over a high data rate serial transmission link, comprising:
    a transmitter comprising:
        means for generating and inserting a 2-bit cyclical sequential synchronization into sequence attached to a header that is transmitted with each block of data, said synchronization incremented or decremented for each block of data transmitted, the sequence being, reset after reaching maximum or minimum value;
        means for transmitting an idle block of data during attempts to synchronize the transmission of said blocks of data;
        means for transmitting said blocks of data over a plurality of serial transmission links;
    a receiver comprising:
        means for receiving data over said plurality of serial transmission links;
        means for multiplexing different groups of received bits, each group representing a different framing position, wherein one of said framing positions is selected in accordance with a selection signal;
        means for searching data output of a current framing position for said 2-bit synchronization sequence; and
        means for repeatedly selecting a different framing position via said selection signal and searching said received data for said 2-bit synchronization sequence if synchronization is not found.

8. The apparatus according to claim 7, wherein said synchronization sequence loops through the pattern: 00, 01, 10, 11.

9. The apparatus according to claim 7, wherein said block of data comprises an Asynchronous Transfer Mode (ATM) 48 byte cell payload.

10. The apparatus according to claim 7, wherein said block of data comprises a 48 byte payload comprising Ethernet data.

11. The apparatus according to claim 7, wherein said idle block comprises all ones except for said synchronization field.

12. The apparatus according to claim 7, wherein said means for searching comprises a count state machine and a sync state machine for searching for and tracking the cycling of said synchronization field sequence.

13. The apparatus according to claim 7, wherein said period of time comprises a multiple number of cell times wherein each cell comprises 48 bytes.

14. The apparatus according to claim 7, wherein said transmitter comprises differential line drivers for transmitting a plurality of differential signals.

15. The apparatus according to claim 7, wherein said receiver comprises differential line receiver for receiving a plurality of differential signals.

16. A receiver, comprising:
    means for receiving data over a plurality of serial transmission lines;
    multiplexer means adapted to receive different groups of received data bits and to generate different framing positions therefrom in response to a multiplexer control signal;
    a count state machine for searching the most significant two-bit output of said multiplexer means for the presence of a cyclic synchronization sequence and generating a sync status signal in response thereto;
    a sync state machine for controlling the framing position of said multiplexer means in accordance with said sync status signal output of said count state machine; and
    wherein said sync state machine and said count state machine are adapted to select different framing positions until a synchronization sequence is found and able to be successfully tracked from cell to cell.

17. The receiver according to claim 16, wherein said cyclic synchronization sequence loops through the pattern: 00, 01, 10, 11.

18. The receiver according to claim 16, wherein said received data comprises an Asynchronous Transfer Mode (ATM) 48 byte cell payload.

* * * * *